March 17, 1959 H. W. BISHOP ET AL 2,877,541
MACHINES FOR INSTALLING COMPONENTS
Filed Nov. 8, 1955 13 Sheets-Sheet 5
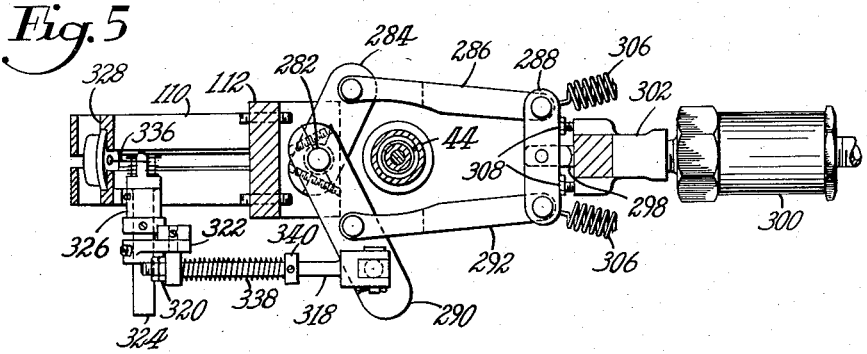
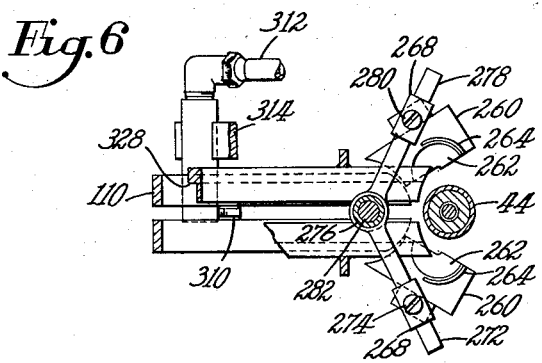
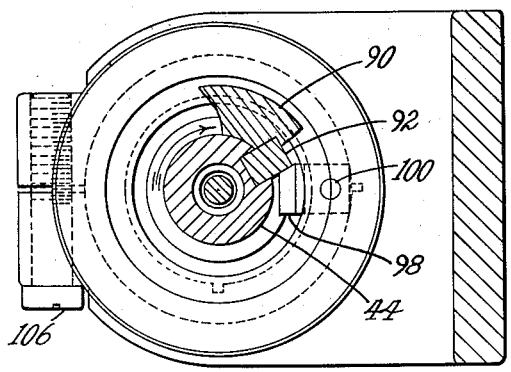
Inventors
Harold W. Bishop
Basil A. Strout
By their Attorney
Thomas J. Ryan March 17, 1959

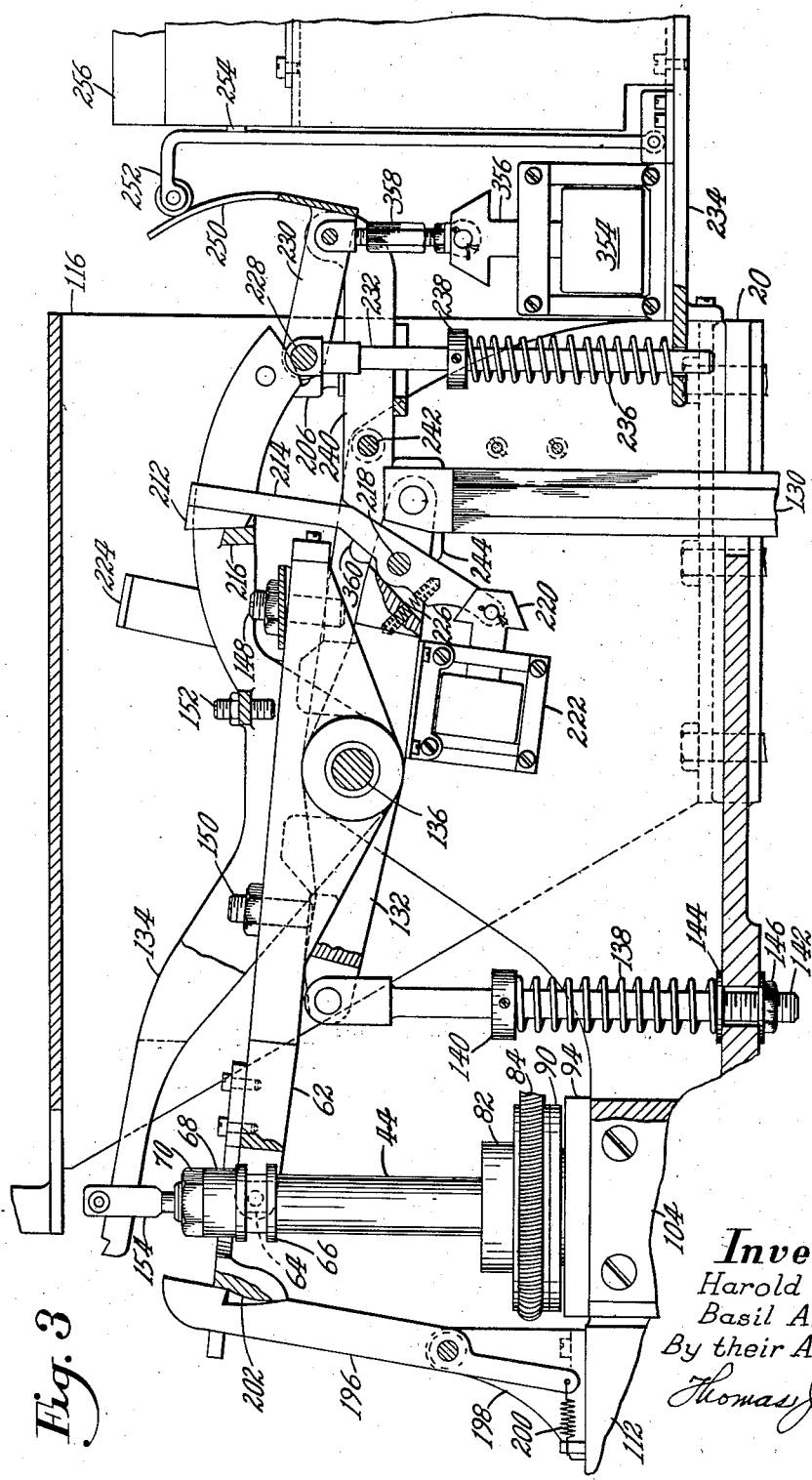

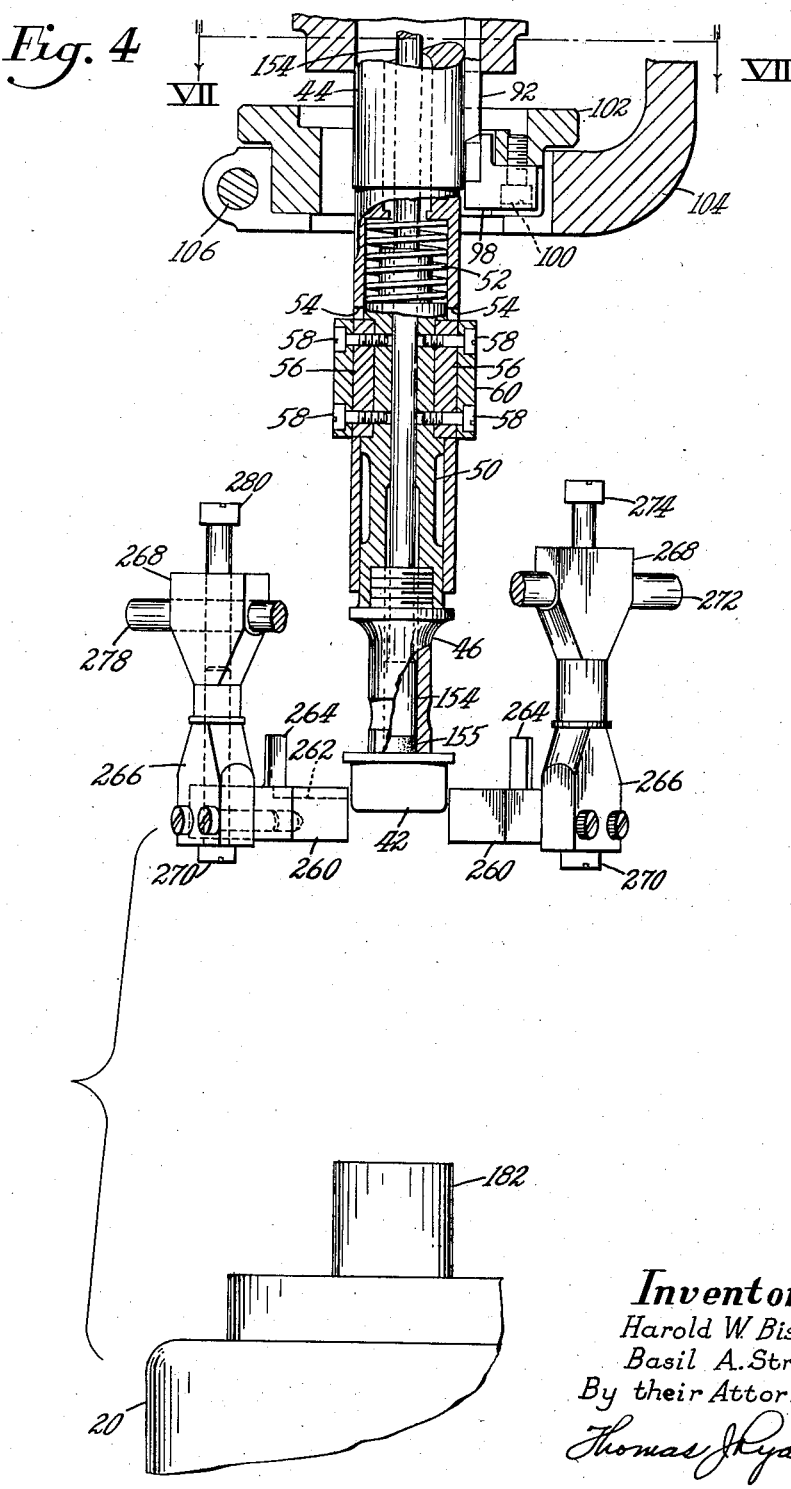

H. W. BISHOP ET AL 2,877,541

MACHINES FOR INSTALLING COMPONENTS

Filed Nov. 8, 1955

Inventors
Harold W. Bishop
Basil A. Strout
By their Attorney
Thomas J. Ryan

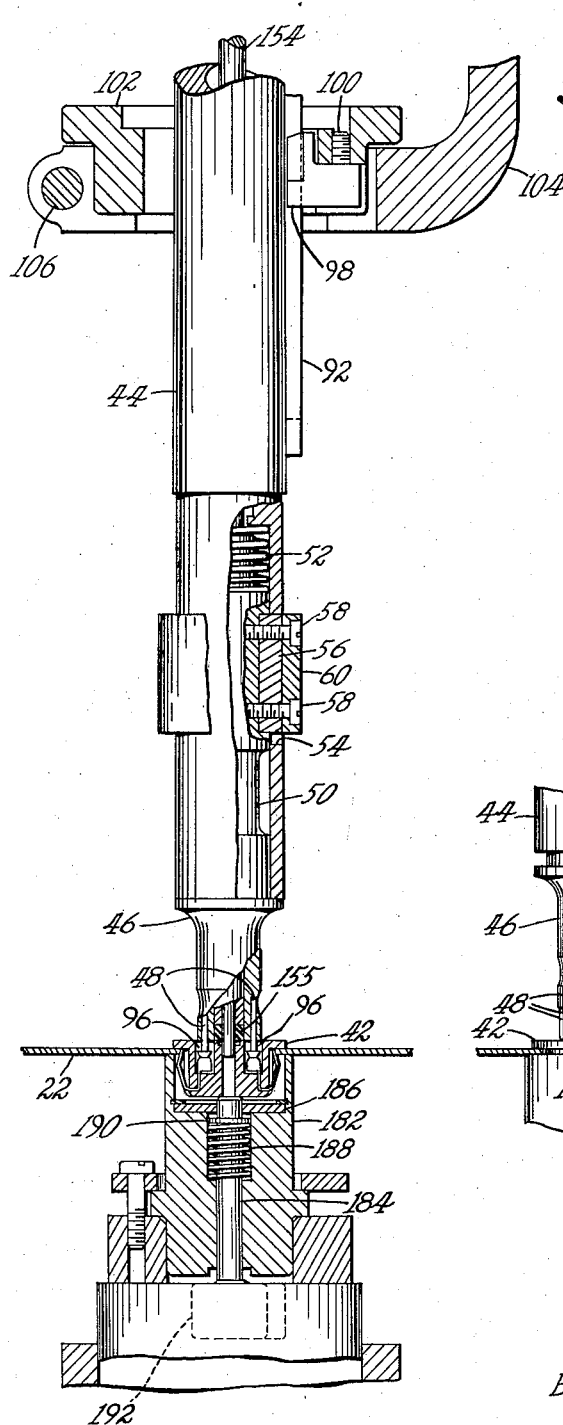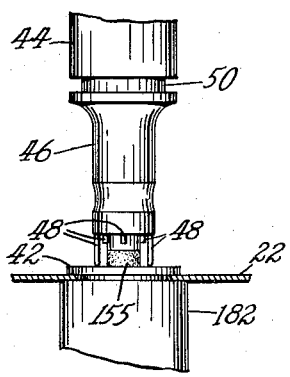

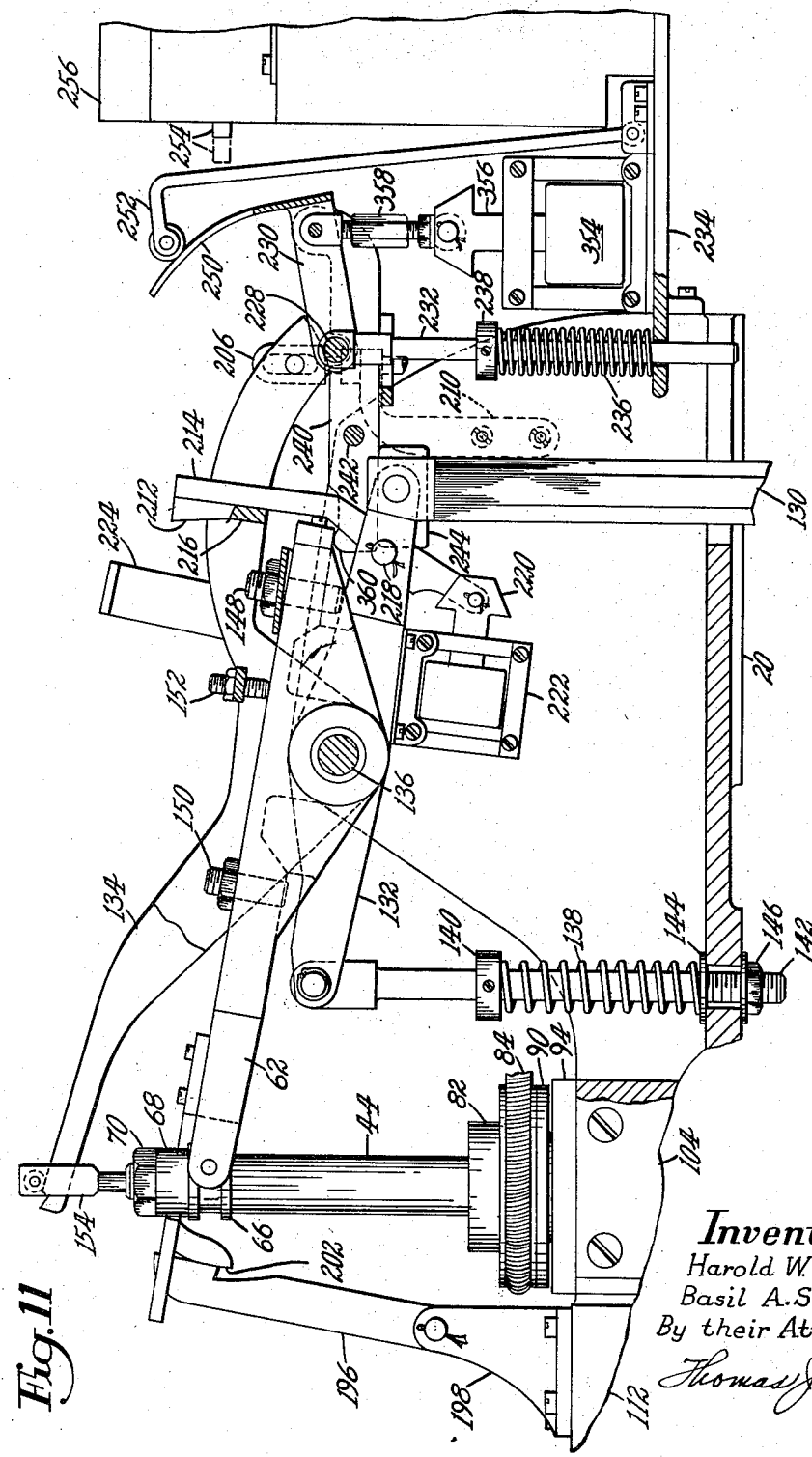

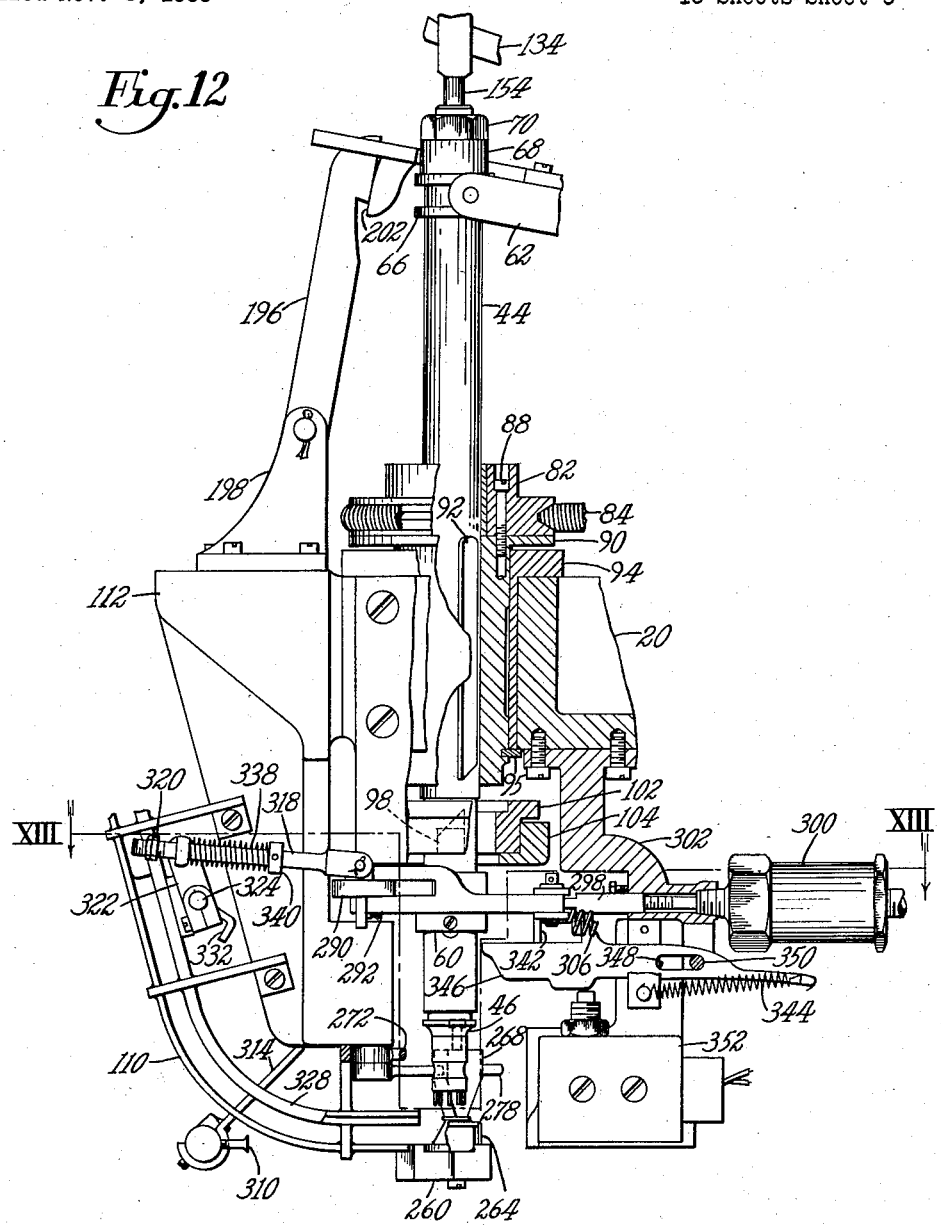

March 17, 1959 H. W. BISHOP ET AL 2,877,541
MACHINES FOR INSTALLING COMPONENTS
Filed Nov. 8, 1955 13 Sheets-Sheet 10
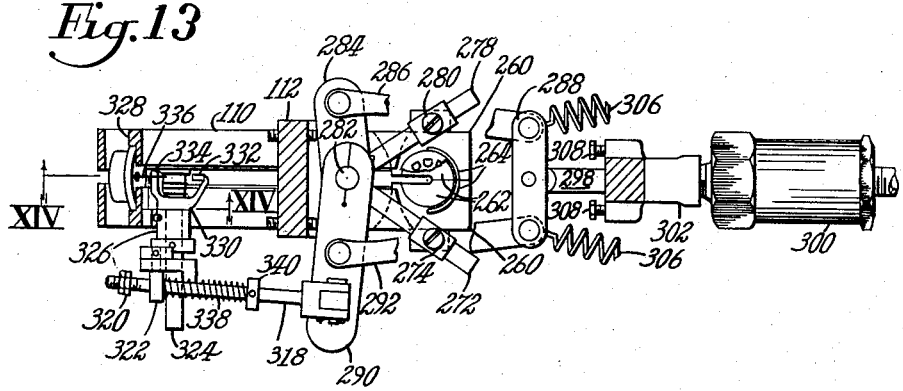
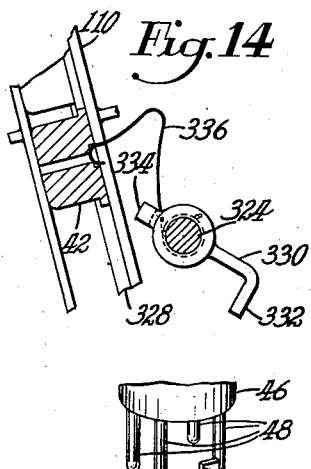
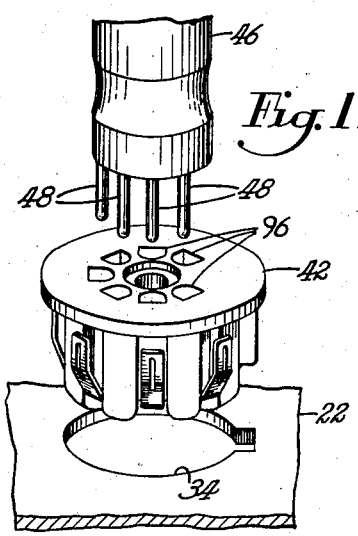
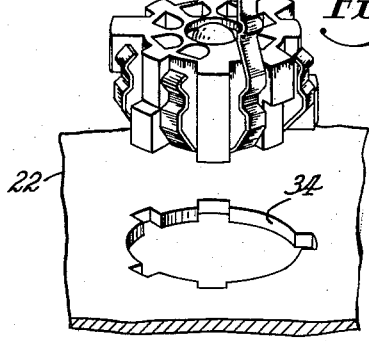
Inventors
Harold W. Bishop
Basil A. Strout
By their Attorney
Thomas J. Ryan

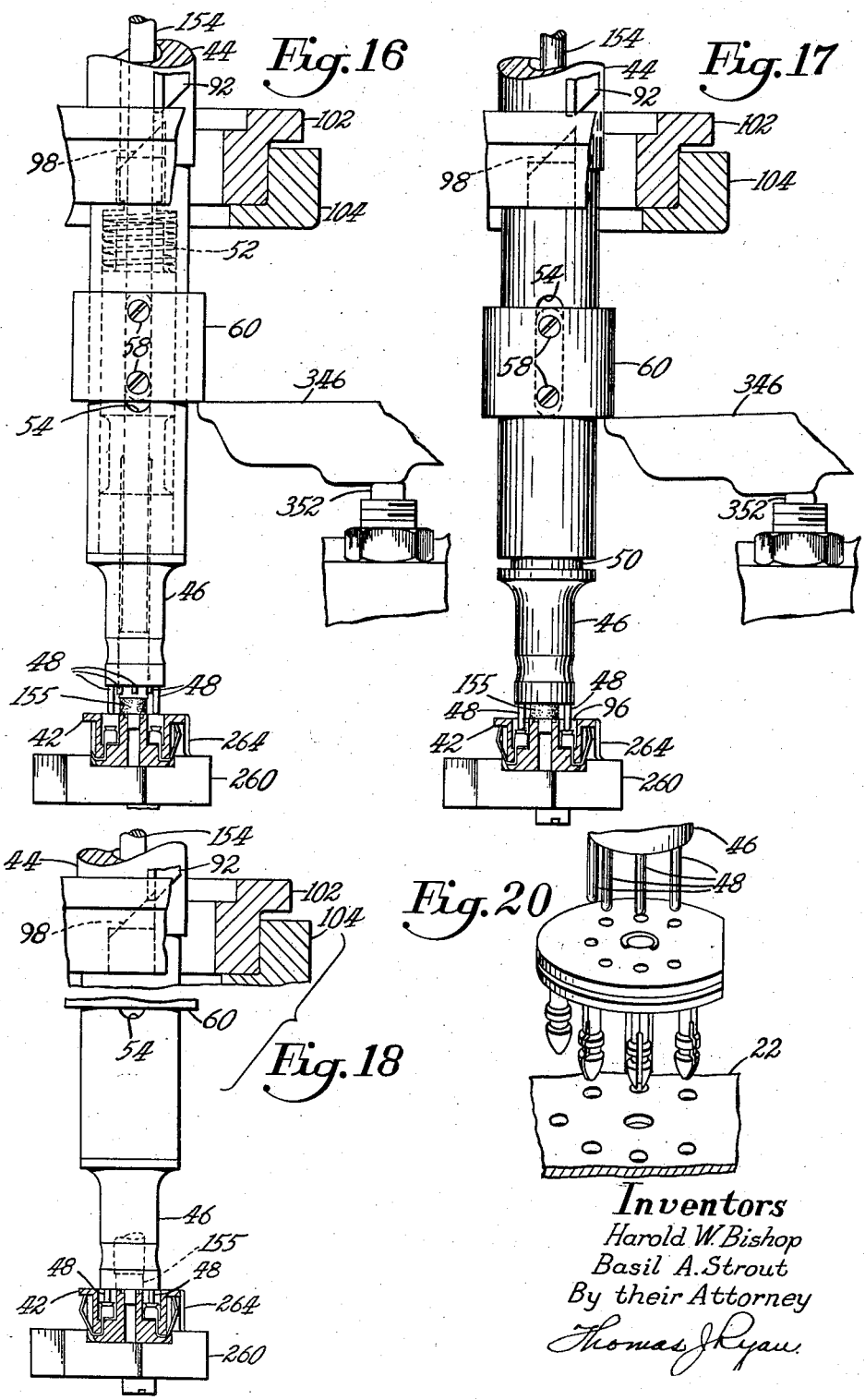

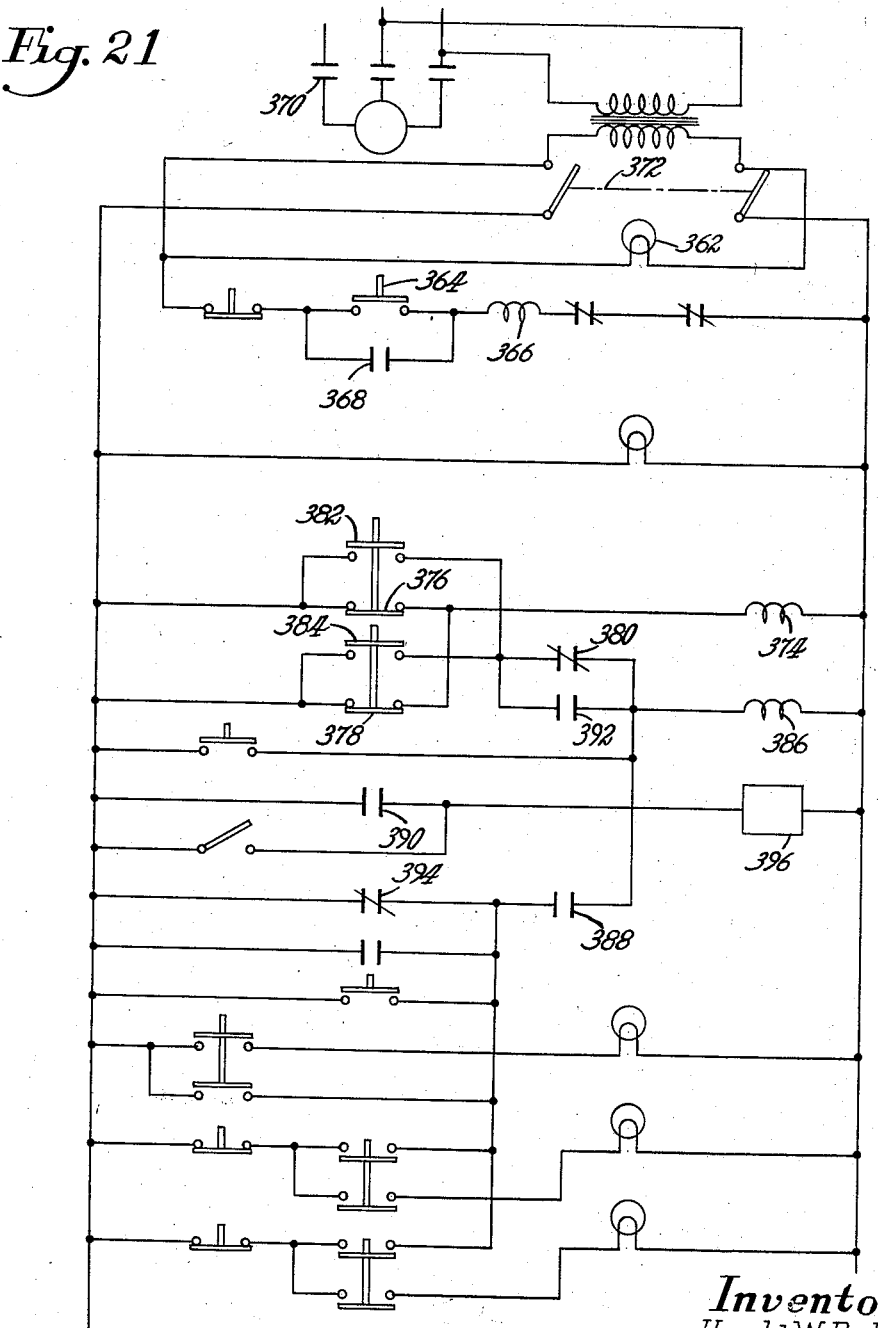

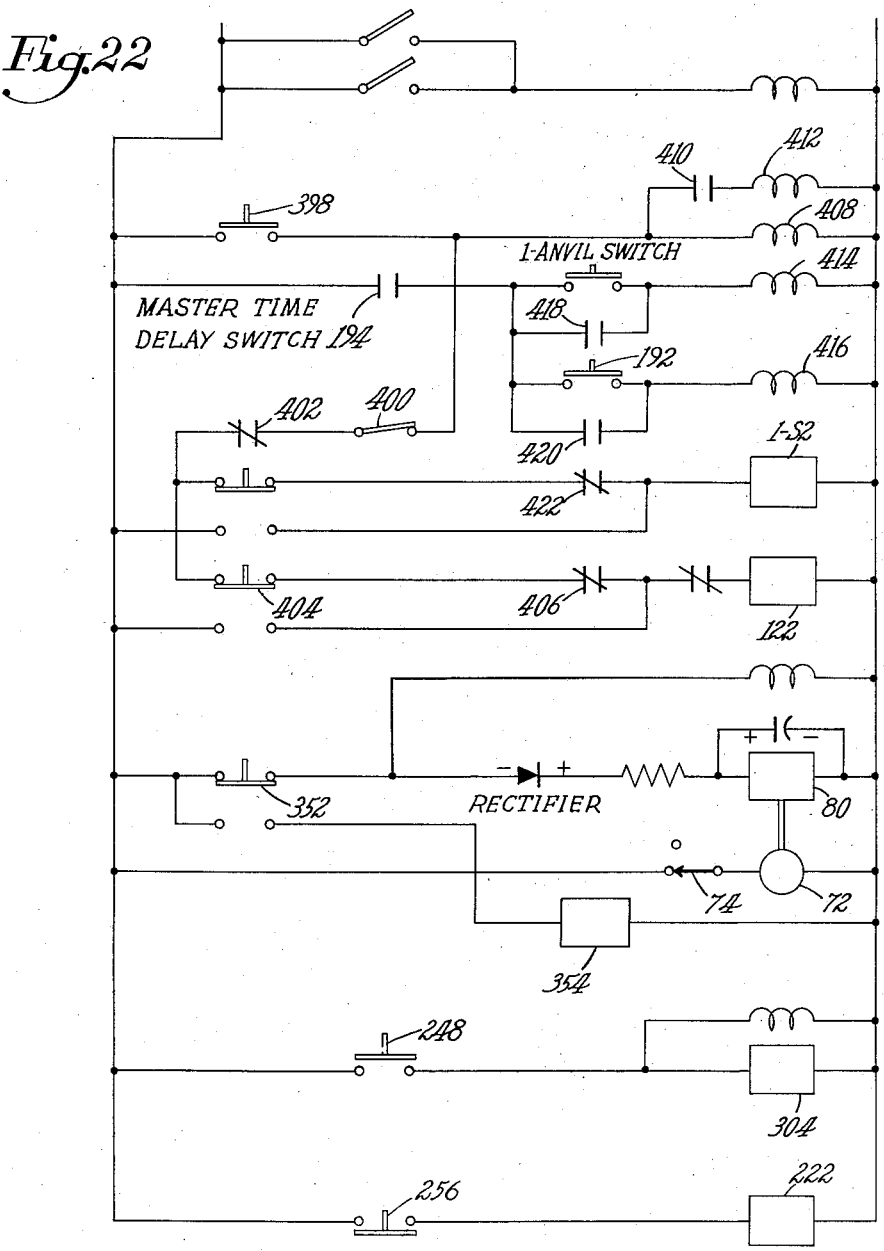

United States Patent Office 2,877,541
Patented Mar. 17, 1959

2,877,541

MACHINES FOR INSTALLING COMPONENTS

Harold W. Bishop, Essex, and Basil A. Strout, Saugus, Mass., assignors to United Shoe Machinery Corporation, Boston, Mass., a corporation of New Jersey Application November 8, 1955, Serial No. 545,765

11 Claims. (Cl. 29—203)

This invention relates to means for installing successive articles from a random mass, and is more particularly concerned with machines for successively mounting and registering parts in interlocking relation with work pieces respectively adapted to receive them. While the invention is herein disclosed by way of illustration as applied to a machine for automatically installing tube sockets or similar components in wiring boards and accordingly is primarily intended for use in the electronics industry, it will be understood that the invention is not thus restricted in its field of use, but various features thereof will be found valuable in other types of work for the assembling of different work pieces and otherwise.

Printed wiring boards have come into rather general use as chassis upon which to mount the numerous components found in electronic circuits. In some instances groups of holes in these boards are arranged in special pattern and located in predetermined relation to the printed wiring to accommodate only specified corresponding groups of terminal connectors or prongs of such components, for example, as tubes, condensers, and transformers. In other instances larger single holes in a board have their respective peripheries shaped for snap-in insertion of a complemental can, socket, potted component, or the like, only when their respective projecting body portions or terminals are oriented so as to effect interlocking and insure appropriate electrical contacts with the printed wiring. Proper register of the chassis and components in peripherally keyed interlocking relation ordinarily requires that the components be moved about an axis before their bodies and/or their connecting elements can be received in the corresponding holes for which they are intended. This fitting is a tedious task necessitating considerable care and heretofore generally practiced manually. To some extent assembly work has been facilitated by the provision of mounting sockets of improved design, such sockets often having seven or nine circularly arranged bores, for example, for removably receiving in correct orientation the respective base pins or prongs of a component such as a tube. Application of these sockets to the wiring boards from an unoriented supply has, so far as we are aware, heretofore remained manual and therefore costly. Among the complicating factors involved in mechanically inserting tube sockets are the very large variety of sockets and body shapes commercially used, the difficulty of controlling their feed, and insuring that an inserted socket is not damaged or withdrawn by an installing tool. A further consideration in the case of an automatic production line is that, in order not to retard output, an operating cycle is allotted only a short time of the order of two seconds.

In view of the foregoing it is a primary object of this invention to provide a novel and versatile machine for expeditiously interlocking successive work pieces such as component-mounting sockets in complemental formations in chassis, said machine being capable of high production without the immediate attendance of a skilled operator.

To the end just stated, a feature of the invention resides in the combination of a support for a chassis having an opening shaped to mount a socket in interlocking registered relation, a machine head above said support, a rotatable spindle reciprocable heightwise in said head relatively to said support, said spindle yieldably carrying a socket holder receivable in the pin-receiving holes of a socket, means including a raceway mounted on the head for guiding one socket at a time from a random supply to a position proximate to the retracted spindle stem, closeable gates adjacent to the delivery end of said raceway to support a socket for the reception of prongs on said holder, means for operating said gates in time relation to the operating stroke of said spindle, and means responsive to the opening of said gates for causing the advancing socket holder to cease rotation when the socket thereon is in register with the chassis opening.

The illustrated machine shown herein is particularly well adapted for operation in an automatic production line, for example at a station in the type of conveyorized electronic assembly line disclosed in United States Letters Patent No. 2,772,416, granted December 4, 1956, on an application filed in the names of Adolph S. Dorosz and Thomas W. Snow. It will be understood that the exemplary machine may, with minor modification, be employed independently or in other types of automatic production systems. As herein set forth the machine is provided with electrically controlled, pneumatically actuated socket inserting mechanism. Anvil testing means cooperating with this mechanism to control its retraction insures that an installation is properly executed in one cycle before the machine can progress into the following cycle. Each socket delivered from a random supply and to be installed is received from a raceway by floor gates that support a socket while the prongs of a rotary socket holder yieldably mounted on a reciprocable spindle find themselves in corresponding pin-receiving holes of the socket. Mechanism is thereupon automatically actuated fully to thrust the holder prongs into these socket holes, and the holder assumes a selected keyed position determined by clutch means to predeterminedly orient the socket, the gates having opened responsively to allow the spindle to descend with the socket until the latter finds itself in register with a socket opening in the chassis. Thereupon the remainder of the installing stroke is effected without rotation to assemble the socket and chassis. In the course of these steps a hold-down, which initially cooperated with the closed gates to hold the socket thereon against rotation, descends to bear upon the socket when it has been installed, thus bracing it against withdrawal while the spindle and socket holder are retracted, the hold-down being returned to its inoperative position at the close of each cycle.

The above and other features of the invention, including novel parts and details of construction, will now be set forth in more particularity in connection with an illustrative embodiment thereof and with reference to the accompanying drawings, in which—

Fig. 3 is a view in side elevation of actuating mechanism shown in Fig. 1, portions of the machine being broken away;

Fig. 4 is a front elevation and largely in vertical section showing the lower portion of the spindle and its socket holder as associated with a pair of open floor gates;

Fig. 5 is a section taken on the line V—V of Fig. 2 indicating socket-feeding mechanism and looking in the direction indicated by arrows;

Figure 2:
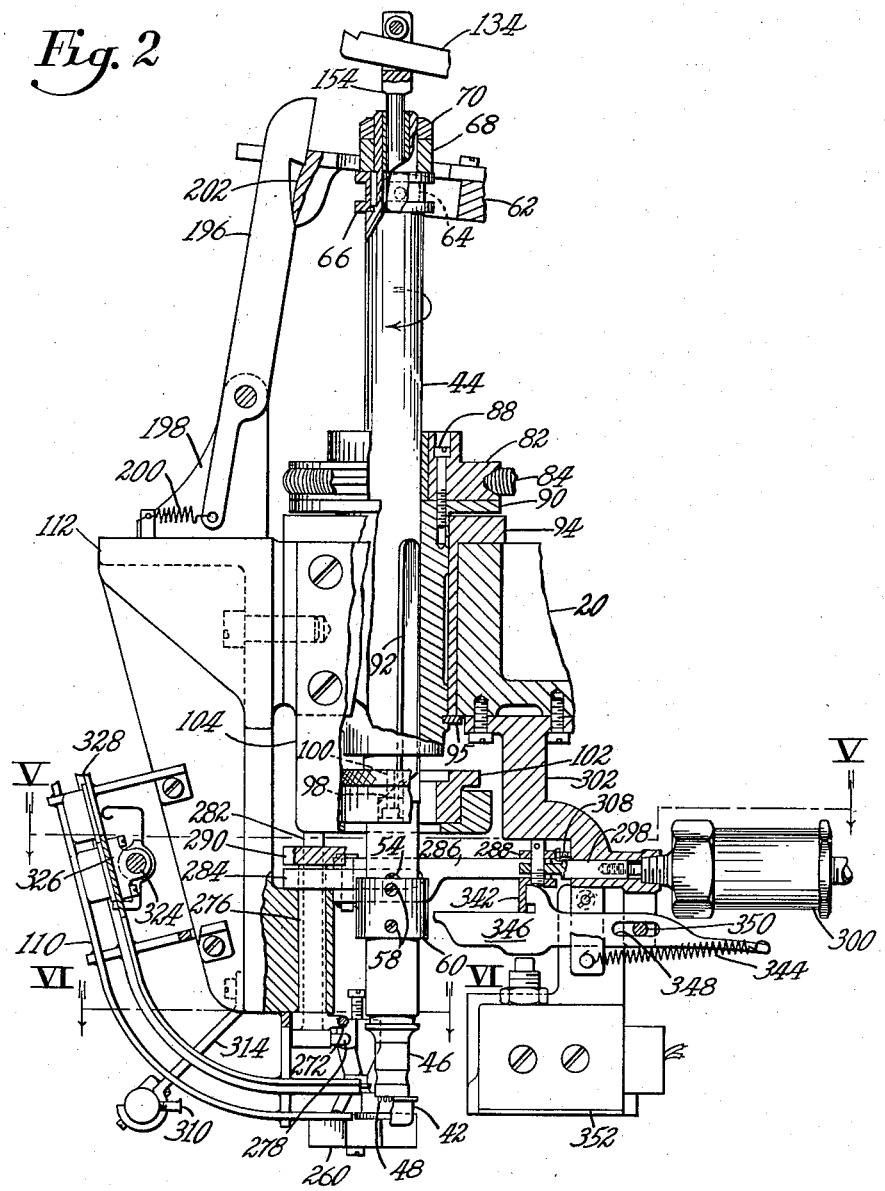
Fig. 2 is a view in side elevation and partly in section and on a larger scale of the spindle and associated parts of the installing head of the illustrative machine shown in Fig. 1.
Figure 8:
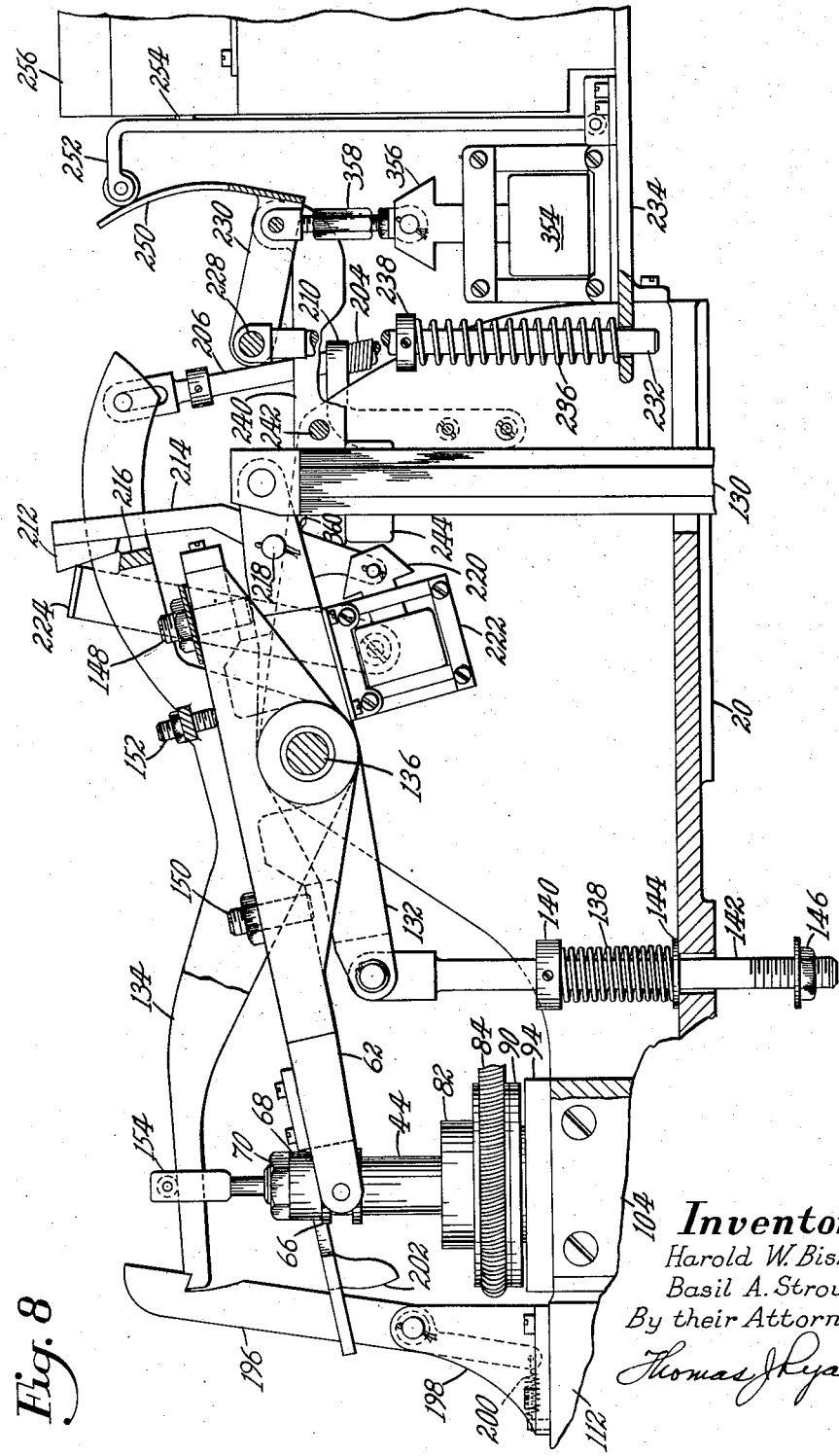

Fig. 6 is a section taken on the line VI—VI of Fig. 2, looking in the direction of the arrows and showing other parts of the socket feeding means;

Fig. 7 is a section taken on the line VII—VII of Fig. 4 and indicating means for keying the spindle;

Fig. 8 is a view in side elevation corresponding to Fig. 3, but showing the parts in positions occupied at a later stage in a cycle;

Fig. 9 is a view in side elevation and largely in section showing a socket when it has been installed by the spindle and engaged by a hold-down, anvil mechanism being indicated in co-operative position;

Fig. 10 is a detailed view of the installed socket being retained by the hold-down during retraction of the spindle;

Fig. 11 is a view in side elevation corresponding to Figs. 3 and 8, but showing the parts in relative positions occupied at a still later stage in a cycle;

Fig. 12 is a view in side elevation, partly in section, corresponding with Fig. 2, but showing the head parts in their relative positions when the spindle has been fully retracted as determined by the actuating mechanism in the stage shown in Fig. 11;

Fig. 13 is a section taken on the line XIII—XIII of Fig. 12 and indicating the floor gates in closed position together with socket escapement mechanism;

Fig. 14 is a detail of the socket escapement mechanism;

Fig. 15 is an exploded perspective view of a wiring board aperture, the socket to be mounted therein, and the socket holder;

Figs. 16, 17, and 18 are progressive views in side elevation of a socket being mounted on a holder-inserting tool of the machine preparatory to installation;

Fig. 19 corresponds with Fig. 15 except that a modified form of socket is shown;

Fig. 20 is a perspective view of a laminated type socket having prongs to be inserted into individual wiring board openings by the machine; and Figs. 21 and 22 are complemental portions of a schematic wiring diagram indicating the manner in which the socket inserting machine and another representative machine are electrically connected to the conveyor control system, the latter here being shown in parallel arrangement, and all elements being indicated in their normal or rest positions.

Figure 1:
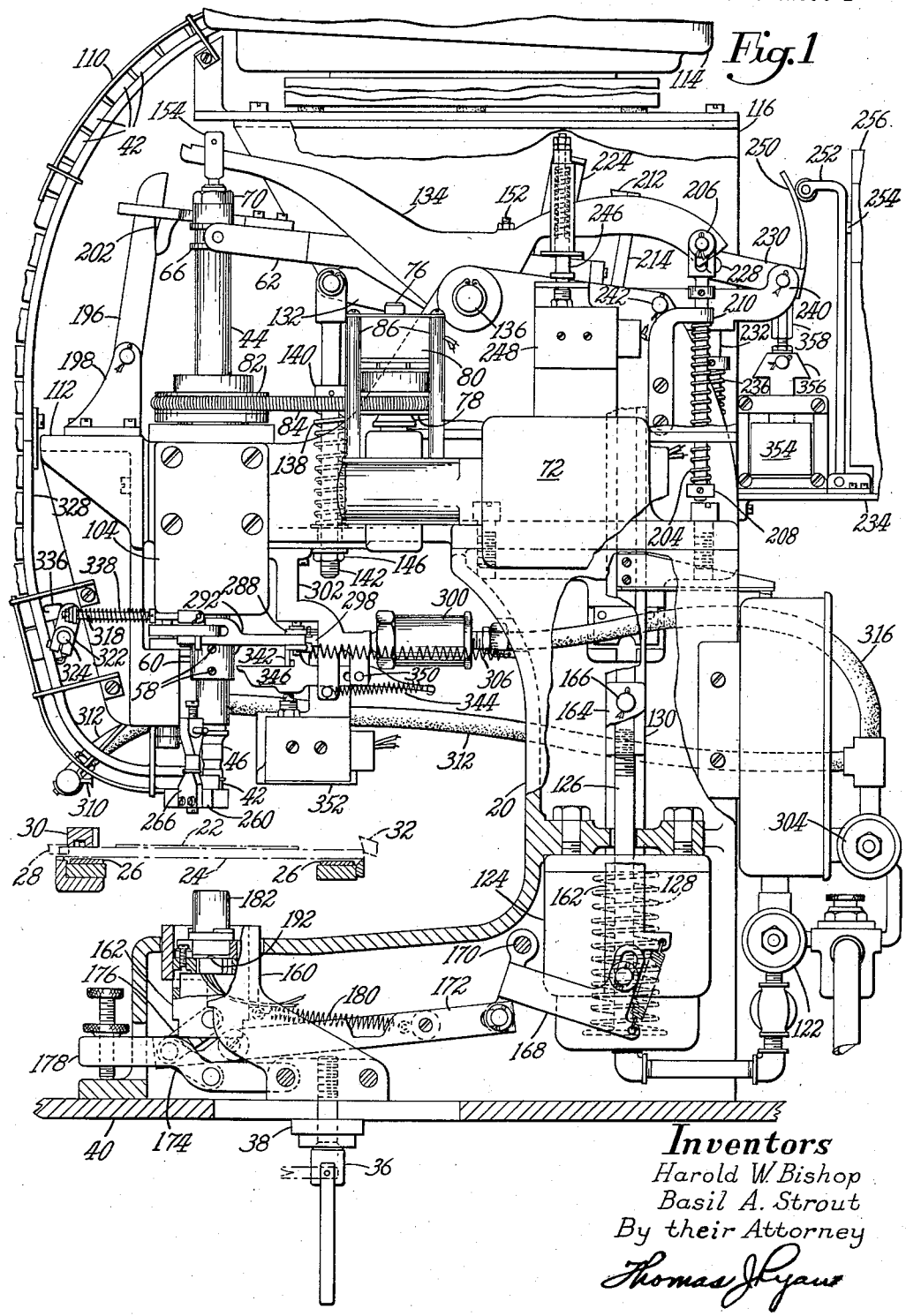
Fig. 1 is a view in side elevation of a machine embodying this invention, the parts being shown in normal rest position and portions being broken away to reveal construction details.

Referring to Fig. 1, the illustrative machine comprises a hollow C-frame 20 secured at a station on a conveyorized assembly line of the type shown and fully described in the aforementioned Dorosz et al. patent. Accordingly, chassis in the form of printed circuit or wiring boards 22 (Figs. 9 and 10) for receiving electronic components may be detachably mounted on pallets 24 (Fig. 1) respectively, and the pallets 24 carried successively by parallel, endless belts 26, 26 (Fig. 1) to one after another of the operating stations along the line. As disclosed in the Dorosz et al. patent, means not herein wholly shown, but including a clamping arm 28, a guideway 30, and a dampening detent 32 is provided for clamping the pallets on arrival at their operative stations, the pallets then being disassociated from the continuously operated belts, and it may be presumed that during the actual installing portion of a cycle of operations of the illustrative machine a pallet 24 is clamped fixedly to support a wiring board 22 so that a socket receiving opening or aperture 34 (Fig. 15) therein of appropriate configuration will be in alinement with component installing instrumentalities in the head of the machine. It will be appreciated that a larger portion of the operating cycle of the machine advantageously transpires during passage of the pallets between conveyor stations. For insuring the alinement referred to, as well as proper adjustment of the machine about a vertical axis, the base of the machine threadedly carries a clamp bolt 36 extending through a cross bar 38 by means of which the machine is anchored on a table 40. Automatic actuation of the illustrative machine in response to pallet clamping is under the control of means similar to that previously disclosed in said application and hereinafter referred to briefly. It may be further noted that pneumatic actuating means found in this illustrative machine resembles that employed in a coaxial lead type component inserting machine disclosed in an application Serial No. 458,312, filed September 27, 1954, in the names of Leon D. Alderman, Charles P. Cardani, Edwin S. Kant, and Henry B. Kimball, the similar features facilitating construction and operation of the assembly system as a whole.

In the normal rest position of the machine, indicated in Figs. 1 to 4 inclusive, a conveyor-borne pallet 24 supporting the wiring board 22 which is next to receive a socket 42 (Figs. 1 and 9) to be inserted by installing instrumentalities about to be described, is approaching the arm 28 and about to be clamped thereby in a predetermined position such that the aperture 34 will be in register with the head of the machine. The installing instrumentalities in the head consist primarily of a tubular, rotary spindle 44 movable heightwise through the overhanging, vertically bored portion of the frame 20 and controlled by mechanism to be described, and a hollow socket holder 46 (Fig. 4) provided with prongs 48 (Figs. 2, 9, and 10), this holder being threaded into a tubular stem 50 (Fig. 4) slidable vertically in the lower end of the spindle 44. The stem 50, and hence the socket holder, is yieldingly urged downwardly by a compression spring 52 (Figs. 4 and 9) seated in the spindle 44 and engaging the stem endwise. For limiting relative heightwise movement of the holder and the spindle the latter is formed with oppositely disposed slots 54, 54 (Fig. 4) in which blocks 56, 56 respectively ride, these blocks being secured to the stem 50 by means of screws 58 which also extend, for a reason later explained, through an external cylindrical ring 60. Heightwise movement of the spindle is effected by a lever 62 (Figs. 2 and 3), the front end of which is bifurcated pivotally to carry a pair of oppositely disposed bearing blocks 64 arranged to be received between annular flanges formed on a sleeve bearing 66 keyed on the spindle for rotation therewith and secured upon the reduced upper end of the spindle by a nut 68 and a lock nut 70.

For rotating the spindle 44 together with the socket holder 46 about its vertical axis and in the direction of the arrow shown in Fig. 2, i. e., clockwise as viewed from above, an electric motor 72 (Fig. 1) controlled by a power switch 74 (Fig. 22) is mounted on the frame 20 and, through suitable reduction gearing (not shown), normally drives continuously a vertical pulley shaft 76 (Fig. 1). A pulley 78 is mounted on the shaft 76, and when a coil 80 of a conventional electromagnetic clutch is energized, frictional driving connection between the pulley 78 and the shaft 76 is established to rotate a pulley 82 (Figs. 1 and 2) on the spindle 44 by means of a spring belt 84. The clutch coil 80 is fixedly supported adjacent to the pulley 78 by four rods 86 upstanding from housing of the aforementioned reduction gearing and has electrical connection with the main power line of the conveyor as indicated in Fig. 22. The pulley 82 is secured by a screw 88 (Fig. 2) to the upper end of a sleeve 90 which is vertically slotted slidably to receive a spline 92 (Figs. 2, 4, and 7) secured axially on the spindle 44. The sleeve 90 is accordingly rotatable in a sleeve bearing 94 to drive the spindle when it occupies certain heightwise positions, the bearing 94 being supported by its flanged upper end on the head of the frame 20 and retained against upward displacement by a snap ring 95 seated in the sleeve 90 and abutting the frame.

The socket holder 46 with its prongs 48, which though in rest position of a cycle have been fully thrust by mechanism later described into the correspondingly arranged base-pin receiving holes 96 (Figs. 9 and 15) in a socket 42 next to be installed, have been arrested in their rotation when the periphery of the socket thereon has come into proper register with what will become the position of the perimeter of the socket receiving aperture 34 in the wiring board 22 when the latter is clamped. For this purpose an orienting key 98 (Figs. 2, 4, and 7) serves as an adjustable stop engageable with the lower end of the spline 92 when the spindle 44 is in its normal rest position heightwise. The key 98 is affixed by a screw 100 (Figs. 2 and 4) to a knurled annular member 102 that is normally held clamped in selected operating position in the lower split end of a bracket 104 secured at its upper end to the frame 20. By turning a clamping screw 106 (Figs. 4 and 7) threaded into the split end of the bracket, loosening or tightening of the member 102 for purposes of adjustment about a vertical axis may be effected to position the key as required by the particular clamped wiring board. It will be understood that upon engagement of the spline 92 with the key 98 rotation of the spindle 44 stops with the prongs correctly oriented, and while the machine is thus in rest condition and thereafter when the spline and key are engaged the energized coil 80 permits the clutch to slip.

For successively supplying sockets 42, one by one, to the socket holder 46 for installation, a raceway generally designated 110 (Figs. 1 and 2) is secured to a bracket 112 mounted on the front of the frame 20. The upper end of the raceway is in communication with a suitable vibratory hopper 114, for example one of the electrical type available commercially from the Syntron Company, containing a mass of sockets, the hopper being mounted on the top of a bracket 116 extending upwardly from the frame 20. The raceway is accordingly kept well supplied with sockets that are not oriented with respect to their axes, but which do assume corresponding face-up positions at the lower or delivery end of the raceway which is laterally adjacent to the rest position of the socket holder 46. The lowermost socket having been transferred from the raceway and fully received by the prongs 48 when the machine is in rest position, as indicated in Fig. 4, escapement mechanism later to be explained controls the descent by gravity of the subsequent sockets to be installed.

Assuming now that a pallet 24 has been clamped at the socket-installing station (other pallets being similarly clamped at the other operating stations of the conveyor), electrical means hereinafter explained is automatically actuated which energizes a solenoid valve 122 (Fig. 1), admitting air under pressure into an air motor 124 to initiate the machine cycle. As a consequence, a piston rod 126 of the motor 124 is moved upward against the resistance of a return spring 128. The upper end of the rod 126 (Figs. 1 and 3) is threaded into the lower end of a bar 130 having its upper end pivotally connected to an actuating lever 132. The latter, together with the spindle-operating lever 62 and a hold-down operating lever 134 (Figs. 3, 8, and 11), which are to be moved in synchronism for purposes to be described, are fulcrumed on a stud 136 journaled in the frame 20. Accordingly, resultant counterclockwise movement (as viewed in Figs. 3, 8, and 11) of the actuating lever 132 compresses a return spring 138 (Fig. 3), this spring being mounted beneath a collar 140 fixed on a rod 142 depending from the front end of the lever 132. The spring 138 abuts endwise a frame-engaging washer 144 on the rod 142, the latter being movable heightwise through a bore formed in the frame 20. A nut 146 threaded on the lower end of the rod 142 normally engages an underside of the frame and, under the upward influence of the spring 138, adjustably determines the normal rest position of the actuating lever 132. The counterclockwise movement of the lever 132 is transmitted to the spindle-operating lever 62 by the lever 132 engaging endwise an adjusting screw 148 (Figs. 3, 8, and 11) threaded through the rearward end of the lever 62. The spindle 44 is thus caused to descend from rest position, the front end of the lever 132 moving downward away from an adjusting screw 150, hereinafter to be mentioned, and threaded through the front end of the spindle-operating lever 62. By means of an adjusting screw 152 threaded through the hold-down lever 134 and arranged to be engaged by the rearward end of the lever 62 the counterclockwise movement of the levers 62, 132, and 134 is synchronized. Thus, a vertical hold-down 154 (Figs. 2 and 4) is slidable heightwise in, or with, the spindle 44 as determined by a pivotal movement of the lever 134 from the front end of which the hold-down is suspended. In normal rest position to facilitate prong insertion a rubber-tipped lower end 155 (Fig. 10) of the hold-down 154 centrally engages the upper end face of the socket to be installed, as shown in Fig. 4, and thereafter the holder 46, with oriented socket in engagement with the hold-down, is moved downwardly to the position indicated in Fig. 9, at which stage the actuating levers assume the positions indicated in Fig. 8.

Installation of the socket in the wiring board aperture is completed by the final portion of the downward movement of the spindle 44 and the socket holder 46, the spring 52 being compressed to seat the hold-down 154 firmly on the fully inserted socket the, limit of the downward movement being determined by a stop in the motor 124. In conformity with the conveyor system disclosed in said Dorosz et al. patent the machine is provided with anvil test mechanism which may be adapted, if needed for certain component terminals, to afford clinching action and is more especially designed to insure that an installation is effected in each machine cycle. Since this test means is closely analogous to the anvil structure disclosed in United States Patent No. 2,758,303, granted August 14, 1956, on an application filed in the names of Harry E. Dow and Raymond P. Legro, it will suffice briefly to note that within a cylindrically bored upper end of a bracket 160 (Fig. 1), secured in the base of the frame 20, an anvil holder 162 is arranged to move heightwise in time relation to the installing movements of the spindle 44. The means by which the holder 162 is thus actuated includes a pair of links 164, 164 (one partly shown in Fig. 1) suspended from a cross pin 166 carried transversely by the bar 130, a lever 168 having pin and slot connection with the lower ends of the links 164 and pivoted at 170 on the frame 20, a toggle-actuating link 172 having pin and slot connection at its rearward end with the lever 168, and toggle links 174, 176 having their knee connected to the front end of the link 172. The holder 162 is mounted on the upper end of the toggle link 176, the toggle link 174 being carried at its lower end for heightwise adjustment purposes by a lever 178 that is pivotally secured at its rearward end to the frame. A tension spring 180 connecting the bracket 160 with the link 172 urges the toggle 174, 176 to assume a normally broken position in which an anvil 182 (Figs. 1, 4, and 9), detachably mounted on the holder 162 and adjustable about a vertical axis, is retracted from a toggle straightened or extended position wherein the upper end of the anvil is arranged to be engaged by the properly installed socket 42 as shown in Fig. 9. In the particular construction herein shown the anvil 182 has its upper end recessed to receive a large part of the socket and engage the underside of the board 22, while the upper side thereof is engaged by an end face flange of the socket. It will be understood that other anvil configurations may be substituted as appropriate to given shapes and types of sockets or other components to be installed. Referring to Fig. 9, the anvil 182 is vertically bored slidably to receive a plunger 184. The upper end of this plunger is arranged normally to extend above a flat socket-engaging insert 186 within the anvil, the upper end of a compression spring 188 yieldably engaging a collar 190 on the plunger, and the lower end of the spring abutting a shoulder formed in the anvil bore. Thus, the arrangement is such that full insertion of the socket in the wiring board yieldingly depresses the plunger 184 to the extent that its lower end engages and actuates a microswitch 192 connected with the electrical control system of the conveyor as indicated in Fig. 22. As a consequence, and in harmony with substantially simultaneous functioning of the other operating stations of the conveyor, a signal is transmitted to a master time delay switch 194 (Fig. 22) to de-energize the solenoid value 122, thereby releasing air from the motor 124 and permitting the springs 128 and 138 to commence upward retraction of the spindle 44 and downward retraction of the anvil 182. Conversely, if no socket be properly installed, these retractive movements do not occur until the situation is remedied. Pallet unclamping action is automatically initiated at this stage, i. e., after an installation, to return the several work-carrying pallets to the belts 26 for further conveyance.

It should be noted that just prior to signalling for retraction of the spindle 44, i. e., when a socket has been fully installed, the front end of the hold-down operating lever 134 (Fig. 8) is held in lowered position by a latching lever 196 pivotally mounted on a bracket 198 secured on the bracket 112. The lever 196 is biased toward its latching position by a spring 200 (Figs. 3 and 8) connecting the lower end of the lever with the front of the bracket 198. Accordingly, as the rod 130 descends, the front end of the lever 132 engages the screw 150 to move the lever 62 clockwise (as viewed in Figs. 3, 8, and 11) and hence lift the spindle 44 and the spring 52, the hold-down 154 remaining stationary to prevent the socket from being withdrawn from the wiring board. Further upward movement of the spindle then raises the holder 46 to disengage its prongs 48 from the installed socket whereupon a cam 202 secured to the front end of the lever 62 urges the latching lever 196 counterclockwise from its position in Fig. 8 to unlatch the hold-down lever 134. A pair of loaded compression springs 204 (one shown in Fig. 8) thereupon become effective to rotate the lever 134 clockwise as viewed in Fig. 8 to lift the hold-down from the socket. For this purpose each of the springs 204 is mounted on a rod 206, the upper end of which has pin-and-slot connection with the rearward end of the lever 134. The springs 204 respectively abut endwise a retaining collar 208 affixed on the lower end of the rod and a bracket 210 mounted on the frame and bored slidably to receive the rod. Through the influence of the springs 204, which had become compressed during the downward movement of the hold-down 154, the lever 134 is turned clockwise( as viewed in Figs. 3, 8, and 11) fast enough to cause the screw 152 to engage the lever 62 and impart clockwise movement to the latter whereby the spindle 44 is further raised. The lever 134 must turn more rapidly than the lever 132 at this stage to insure separation of the screw 150 from the lever 132. The clockwise movement of the latter allows a latch 212 (Figs. 3, 8, and 11) on a lever 214 to move into latching position with respect to a latch block 216 on the lever 134, the lever 214 being pivotally mounted on the lever 132 at 218 and having its lower end connected, for a purpose later explained, to a plunger 220 of a solenoid 222 carried by the lever 132. When the socket was being fully installed, the latch 212 had been prevented from cooperating with the block 216 by a stop arm 224 fixed on the frame, though a compression spring 226 (Fig. 3) nested in bores formed in the lever 132 and the latching lever 214 urges the latter counterclockwise. With levers 62 and 134 thus latched, their continued clockwise movement results in the spindle 44 (Figs. 11 and 12) rising above its normal or starting position and above its engagement with the orienting key 98 to resume rotation through the clutch drive, and at about this same time two intermediate control steps ensue which will next be explained.

In one of these steps the cam-shaped descending rearward end of the lever 134 is arranged to engage a pin 228 (Figs. 3, 8, and 11) extending laterally through the forward arm of a bell crank lever 230 and carried by the upper end of a vertical rod 232. The latter is slidable in a bore formed in a bracket 234 secured on the frame, but is yieldingly held against downward movement by a compression spring 236 (Figs. 3, 8, and 11) on the rod, the lower end of the spring abutting the bracket 234 and the upper end of the spring abutting a collar 238 adjustably fixed on the rod. Accordingly, in this step the arrangement is such that the spring 236 becomes loaded as the spindle 44 rises to its uppermost position. The lever 230 is pivotally supported on the rearward end of a lever 240 which is itself pivotally mounted at 242 on the frame, a stop 244 formed on the frame limiting counterclockwise movement of the lever 240. In the second step the lever 62 acts through an adjusting screw 246 (Fig. 1) yieldably mounted thereon to actuate (i. e., close and de-energize) a microswitch 248 secured on the frame, the actuation of this switch occurring prior to completion of the upward stroke of the spindle to give the switch time to control socket-receiving mechanism about to be explained and which is instrumental in insuring transfer of the next endmost socket in the raceway 110 onto the holder prongs 48. Incidentally, it will be noted (Fig. 11) that the pin 228 has at this stage been received in a clearance slot formed in the lever 240, and an upwardly curved arm 250 of the bell crank lever 230 has gradually begun to permit a roll-carrying, switch-operating arm 252 pivoted on the bracket 234 to swing counterclockwise (as viewed in Figs. 3, 8, and 11) and away from engagement with a spring-backed contact 254 of a time-delay switch 256 controlling the solenoid 222 to allow the socket-receiving mechanism referred to to function before unlatching of the lever 214. The switch 256 is supported on an upstanding portion of the bracket 234.

The socket-receiving mechanism just mentioned comprises a pair of detachable socket floor gates 260, 260 (Figs. 2, 4, 6, and 13) arranged to be swung laterally between an open position, as indicated in Figs. 4 and 6, and a closed position (Figs. 2 and 13) in which they cooperate to receive the endmost socket from the raceway and position it in axial register beneath the socket holder 46. The gates are respectively provided with a semi-circular recessed seat 262 and an upright arcuate stop surface 264 (Figs. 4 and 6). Each gate 260 is screwed to a vertically bored block 266 in axial alinement with an upper bored block 268. A clamping screw 270 extending upwardly through the block 266 and threaded into the bore of the block 268 holds them assembled and provides a vertical axis about which the gate is adjustable. One upper block 268 is slidably mounted on a horizontal arm 272 (Figs. 2 and 4) and adjustably held by a screw 274, the arm 272 being integral with a vertical, tubular sleeve 276 rotatable in the frame. The other block 268 is slidably mounted on a horizontal arm 278 and adjustably held by a screw 280, the arm 278 being integral with a pin 282 extending through and rotatable in the sleeve 276. By means of an arm 284 (Figs. 2, 5, and 13) clamped on the upper end of the sleeve 276 and connected by a link 286 to one end of an equalizing lever 288, the gate 260 on the arm 278 is operated. Similarly, by means of an arm 290 clamped on the upper end of the pin 282 and connected by a link 292 to the other end of the lever 288, the gate 260 on the arm 272 is simultaneously operated. The equalizing lever 288 is shifted to swing the gates in time relation to heightwise movement of the spindle 44 by a plunger 298 (Figs. 2, 5, and 13) pivotally connected at one end to the lever 288 and at its other end to a piston (not shown) of an air motor 300, the plunger being horizontally slidable in a bearing bracket 302 (Fig. 1) secured on the frame, and the motor being under the control of a solenoid air valve 304 (Fig. 1) actuated by the switch 248. Thus, in the latter portion of the retractive movement of the spindle 44 the gates 260, 260 close to provide a circular seat 262, 262 positioned at a slightly lower level than the delivery end of the raceway 110 and ready to receive a socket to be mounted on the prongs 48. Closing of the gates is effected against the resistance of tension springs 306, 306 connecting the ends of the lever 288 with the frame and tending normally to hold the gates open to the extent adjustably determined by stop screws 308, 308 threaded into the bracket 302.

On swinging closed as just described, the socket-receiving mechanism operates escapement means now to be described which acts to release a single socket in the raceway for acceleration by a jet of air from a nozzle 310 (Figs. 1, 2, and 6), the socket thus being urged from the raceway delivery end and onto the seat 262, 262. The stop surfaces 264 insure that the socket does not overtravel and may be perforated if necessary to prevent baffled air currents from tending to tilt the socket on its seat. The nozzle 310 is secured in an end of a hose 312 supported by a bracket 314 on the frame, the other end of this hose having communication with a hose 316 (Fig. 1) connecting the motor 300 with the valve 304. Referring to Figs. 2, 5, and 13, the arm 290 has an end pivotally connected to one end of a rod 318, the other end of which threadedly carries a stop nut 320 and slidably extends through a bore formed in an end of a composite bell crank lever 322. The latter is secured at its other end on a pin 324 rotatable in a bearing block 326 (Fig. 2) fast on an inner track 328 of the raceway 110. A member 330 having a retaining finger 332 is affixed on the pin 324 and provided with a projection 334 extending axially of the pin. A spring wire detent 336 is coiled on the pin and secured at one end on the member 330 for rotation therewith, the other end of the detent being normally disposed to be held out of engagement with a socket in the raceway, as shown in Figs. 1 and 2, and the finger 332 then being in retaining position in the raceway. Upon actuation of the arm 290 clockwise, as viewed in Fig. 13, by the leftward, i. e., forward, movement of the plunger 298, a compression spring 338 on the rod 318 is forced endwise by a collar 340 thereon yieldingly to act on the bell crank lever 322 and hence urge the detent 336 into holding relation with a socket as shown in Figs. 13 and 14, the finger 332 being simultaneously raised to release the preceding socket for ejection onto the closed gates 260.

In moving forwardly as just mentioned, the plunger 298 carries with it an L-shaped finger 342 (Fig. 2) thereby enabling a loaded tension spring 344 to shift a control lever 346 (Fig. 2) forwardly and beneath the cylindrical ring 60, as shown in Fig. 12. For this purpose the lever 346 is slidable in depending portions of the bracket 302 to the extent permitted by a slot 348 in the lever and a pivot 350 formed on this bracket and extending into the slot. When the contact 254 of the time-delay switch 256 is fully out of contact with the arm 252 the time-delay switch acts to energize the solenoid 222 to unlatch the lever 214 from the hold-down operating lever 134, thereby allowing the compressed spring 236 to urge the hold-down 154 down on the socket seated on the closed gates as shown in Fig. 16. Now, being unrestrained and under the influence of the weight of the spindle 44, the lever 62 moves counterclockwise and is effective to lower the spindle until the holder 46 lightly engages the top of the socket, as indicated in Fig. 16, and the spring 52 is somewhat compressed. Thus, the socket being restrained from rotation, the prongs 48 rotate about its vertical axis until they aline with the base-pin receiving holes of the socket at which instant the spring 52 is effective to thrust the prongs partly into the respective tubular ends of pin-receiving contacts in the socket holes, as shown in Fig. 17. As the prongs enter the socket holes, the ring 60 depresses the forward end of the lever 346 causing the latter to trip a double-acting microswitch 352 (Figs. 1, 12, 16, and 17) secured on the bracket 302. As a consequence the clutch coil 80 is de-energized to stop rotation of the spindle 44 and hence of the partly impaled socket. Also, actuation of the switch 352 energizes a solenoid 354 (Fig. 1) mounted on the bracket 234 to pull downwardly a solenoid plunger 356 and a connecting link 358 having connection with the lever 240. The latter is accordingly swung clockwise (as viewed in Figs. 1 and 3) so that a forward end portion 360 (Figs. 3 and 11) strikes the rearward end of the lever 62 and thus impels the holder prongs 48 downward and fully into the socket holes, as shown in Fig. 18. Simultaneously, this action of the solenoid 354 swings the bell crank lever 230 clockwise (as viewed in Figs. 1 and 3) to reset the time-delay switch 256 by causing the arm 250 to depress the contact 254 and de-energize the solenoid 222.

As the lever 62 is swung counterclockwise (as viewed in Figs. 3, 8, and 11) the screw 246 is raised sufficiently to allow the microswitch 248 to open and de-energize the solenoid air valve 304, whereby air pressure in the motor 300 is relieved and the gates 260, 260 are permitted to be opened by the springs 306, the plunger 298 being rearwardly retracted. Accordingly, the finger 342 on the plunger 298 displaces the control lever 346 rearwardly from engagement with the ring 60, and the lever 346 releases its pressure on the microswitch 352 which thereupon energizes the clutch coil 80 and de-energizes the solenoid 354. The spindle 44 is thus rotatably driven through the clutch to turn the holder 46 with the socket mounted thereon until the spline 92 is engaged by the key 98, whereupon the clutch slips. All parts having returned to their normal rest position, the operating cycle is then completed and the installing instrumentalities await only the clamping of pallets 24 before descending to start another completely automatic cycle.

The electrical control system of the conveyor, as disclosed in the Dorosz et al. patent, is of the series type. In order to facilitate wiring and accommodate a number of operating stations, a parallel type electrical control system, such as that illustrated in complemental Figs. 21 and 22, is preferred, although it will be understood that, in general, operation of the conveyor mechanism and its stations remains basically unchanged. By way of explaining the manner in which the above described socket-installing machine is connected into the parallel type conveyor control system, the Figs. 21–22 diagram shows the elements for two stations, those associated with the hypothetical machine of the first station being prefixed by numeral one (1), and those associated with the exemplary socket-inserting machine presumed to occupy the second station being prefixed by numeral (2) and/or simply assigned the reference characters above employed for purposes of identification.

The cycle of operations of the socket-inserting machine will now be reviewed briefly in conjunction with operation of the conveyor and having particular reference to Figs. 21 and 22. A pilot light 362 (Fig. 21) glows to indicate when power is impressed on the transformer and available to a starting switch 364. The latter is closed to energize a coil 366 and close contacts 368, 370, closure of the latter energizing a motor M for driving the belts 26, 26. To activate the conveyor and inserter control circuits a line switch 372 is closed, a coil 374 being energized through the parallel, normally closed contacts 376 and 378 of pallet clamp initiating or limit switches to open a contact 380. The clutch coil 80 (Figs. 1 and 22) is accordingly energized, and the spindle 44 rotates until, as above related, its holder prongs 48 find the contact holes of the socket to be installed and thereafter until the socket is oriented by engagement of the spline 92 with the key 98. When both pallets 24 have arrived at their stations, the pallets act to open the contacts 376, 378 and close contacts 382, 384 of the pallet clamp initiating switches. This de-energizes the coil 374 and causes the contact 380 to close whereupon a clamping control coil 386 is energized to close contacts 388, 390, and 392. The contact 388 maintains the coil 374 energized through a switch 394, and the contact 390 energizes a clamp solenoid valve 396 which simultaneously actuates the clamping arms 28 (Fig. 1) fixedly to position the pallets and the boards. As explained in the Dorosz et al. patent, after completion of the clamping strokes of the arms 28, the coil 374 is again energized, the contacts 376, 378 and 382, 384 returned to the positions shown (Fig. 21), and an inserter initiating switch 398 is held closed.

The solenoid valve 122 is energized through a set-up clamping switch 400, a normally closed contact 402, a contact 404 of a three-position switch, and a normally closed contact 406, the spindle 44 thereby being thrust downward from its rest position to insert the impaled socket into the wiring board. The master time delay switch 194 on the conveyor is closed, as will now be described, to de-energize the solenoid valve 122 (and 1–S2) and hense effect upward retraction of the spindle 44, downward retraction of the anvil 182, and pallet unclamping. Thus, when the switch 398 closes, a time delay relay coil 408 is closed, and when the coil 408 times out, the contact 394 opens, and a contact 410 closes. The closing of the latter energizes a coil 412 which closes the time delay switch 194, relay coils 414 and 416 being energized through the one-anvil switch and the socket-actuated anvil switch 192, respectively. These coils are maintained energized through contacts 418 and 420, respectively. A normally closed contact 422 and the contact 406 now open to de-energize the solenoid valves 1–S2 and 122. During resultant retraction of the spindle 44 the microswitch 248 is actuated to energize the solenoid valve 304 and thereby close the gates 260, 260 in readiness to receive the next socket to be installed. Next in the electrical sequence, the time delay switch 256 is allowed to energize the solenoid 222 to unlatch the lever 214, and as a consequence the rotating prongs 48 engage the supported socket, while it is restrained by the hold-down tip 155. As soon as the compressed spring 52 seats the prongs part way in the respective socket contact holes, the double-acting microswitch 352 is thereby tripped to energize the clutch coil 80 and energize the solenoid 354. As a result the prongs 48 are fully inserted in the socket, the time delay switch 256 is reset, and the solenoid 222 is de-energized. The microswitch 248 is then released to de-energize the solenoid valve 304 and open the socket gates 260, 260. The microswitch 352 is now released to de-energize the solenoid 354, and the clutch coil 80 is energized to insure that the socket to be installed will be rotated into the position determined by the key 98 in readiness for the installing stroke.

From the foregoing it will be apparent that this invention provides a wholly automatic and compact machine capable of reliably installing, from a supply en masse, successive components having terminations required to be precisely oriented about an axis. To adapt the machine for insertion of a socket such as that shown in Fig. 19 or for installation of some multi-pronged component of quite different type merely requires the substitution of an appropriate component holder for the one designated 46 herein, adjustment or substitution of new gates 260, 260, and substitution of an appropriately modified raceway 110.

Having thus described our invention, what we claim as new and desire to secure by Letters Patent of the United States is:

1. A machine for installing components successively in chassis, comprising means for supporting a chassis, a main frame adjacent thereto, a holder mounted in the frame for rotation about an axis and for movement along that axis and toward and from an aperture in the supported chassis, said aperture having a periphery formed for receiving a component correspondingly shaped, component supporting means movable on the frame for mounting on the holder the component to be installed in said aperture when said holder is retracted from the chassis, means mounted on the frame for rotating said holder together with the component mounted thereon until the latter is in keyed relation with respect to the periphery of the aperture, and means responsive to the operation of the holder rotating means for removing the component supporting means from the component and for thereupon linearly advancing the holder to install its oriented component in the chassis aperture.

2. A machine for installing components in chassis, comprising a frame, articulated members movably mounted thereon for positioning and supporting a component in axial register with a chassis aperture intended to receive it, a rotatable holder movably mounted in the frame and adapted to engage and carry the component linearly from said supporting members to a chassis and then return, means responsive to the position of the holder for shifting said members to and from component engaging position, mechanism associated with said holder for rotating it when in engagement with the component on said supporting members to cause the component to be rotated an appropriate number of degrees to a stop position in register peripherally with the periphery of the aperture, and means on said frame connected to said holder and automatically operative when the component is thus axially and peripherally registered and free from said members to cause the holder to install the component in said aperture.

3. A machine for installing successive components from a random supply in chassis, said components respectively having a peripheral shape corresponding with receiving recesses formed in the chassis, comprising a frame, a spindle axially movable therein toward and from the chassis, means mounted on the frame for positioning the component axially of the spindle when retracted and for permitting rotation of the axially positioned component, said means including cooperative component supporting members movable into and out of engagement with the component in time relation to the axial movement of said spindle, a rotatable holder mounted on the spindle and adapted yieldingly to engage and releasably carry a component which has been positioned by said means, means supported by the frame for rotating the holder an appropriate number of degrees about the axis of the spindle to cause the component carried thereby to be moved into exact peripheral register with the receiving recess in the chassis, and means movably mounted on the frame and thereupon responsive to removal of the members from their supporting positions for moving said spindle axially to install the component in the chassis recess and retract therefrom.

4. In a component installing machine of the type having a rotatable, reciprocable holder for applying successive components to chassis, a frame means mounted thereon for delivering successive components, with their corresponding end faces similarly disposed, from a random supply proximately to the operating path of said holder, gates mounted on said means and relatively movable to receive each component from said delivering means and cooperatively support it for rotation in a position to be engaged by the holder when the latter is retracted from the chassis, means mounted on the frame for rotating the holder while in engagement with the gate-supported component and thereafter to predeterminedly register the component about its axis and with respect to the chassis, means mounted on the frame and operative when the component is thus registered to move said gates out of the path of the holder, and mechanism operatively connected to the holder for then causing the holder to thrust the component into the chassis.

5. A machine for installing sockets in chassis comprising a frame, movable means mounted thereon for supporting a socket for rotation about an axis, a rotary spindle having bearings in said frame and movable along said axis and toward and from a chassis in which the socket is to be installed, a pronged holder mounted axially on the spindle and adapted yieldingly to engage and rotate the socket on said supporting means when the spindle is retracted, means adjustably connected to the frame for causing rotation of the spindle to cease when the holder has predeterminedly rotated the socket with respect to said axis, and mechanism mounted on the frame and responsive to operation of the last-mentioned means for removing said socket supporting means from the operating path of the spindle.

6. In a component inserting machine of the type having a reciprocable inserting tool and a reciprocable hold-down, a frame, means mounted thereon for releasably and revolvably supporting the component to be inserted with its axis in register with that of a receiving aperture in a chassis, and mechanism mounted on the frame for actuating said tool and hold-down in timed relation whereby the tool, when retracted with the hold-down, can rotate to an adjustable stop position determined by said aperture to register with the component on said supporting means and, when advanced with the hold-down beyond said supporting means, can install the component in said chassis.

7. A component inserting machine as set forth in claim 6 and further characterized in that said tool and hold-down are relatively movable coaxially one within the other.

8. A machine as set forth in claim 6 and further characterized in that said actuating mechanism comprises a tool-operating lever, a hold-down operating lever, and a lever for operating said tool and hold-down operating levers.

9. In a machine for inserting sockets and the like and having a frame, a rotary, reciprocable inserting holder and a hold-down mounted therein for cooperative movement relatively to said holder, means supported by said frame for releasably supporting a socket in axial register with a chassis aperture adapted to receive it, and mechanism mounted on the frame for operating said holder and hold-down toward and from the chassis, said mechanism being effective to cause the hold-down to bear on the socket on said supporting means to aid in rotationally registering the holder with the socket, and to bear on the socket when inserted in the chassis as said holder is withdrawn.

10. In a machine for installing sockets of the type having a plurality of base-pin receiving holes, a frame, a rotary reciprocable spindle mounted in said frame, a holder yieldably mounted on said spindle and having a plurality of prongs arranged to be received in the base-pin receiving holes of a socket, means mounted in said frame and movable in time relation to the operating strokes of said spindle to position each socket for rotation to facilitate the reception of said holder prongs, and drive means mounted in said frame and including a clutch for thereafter rotating said spindle and holder to carry the socket on said prongs to a predetermined position preparatory to installation.

11. In a socket installing machine of the type having a rotary, reciprocable holder provided with prongs arranged to be received in base-pin receiving holes of a socket, a frame, relatively movable means mounted thereon for rotatably supporting a socket coaxially of the holder when the latter is retracted, a raceway supported by said frame for delivering successive sockets to said supporting means, escapement mechanism associated with the raceway for controlling the transfer of sockets to said means from the raceway, means mounted on the frame for rotating the holder in the course of its advance to insert its prongs in the supported socket and predeterminedly orient the socket preparatory to installation, and mechanism mounted on the frame and responsive to the insertion of said prongs in a socket for causing said supporting means to be removed from the path of the holder and the socket carried thereby, said escapement mechanism having operative connection with the last mentioned mechanism.

References Cited in the file of this patent

UNITED STATES PATENTS

| | | |
|---|---|---|
| 2,300,435 | Ricciardi | Nov. 3, 1942 |
| 2,355,522 | Garbe | Aug. 8, 1944 |
| 2,425,127 | Schafer | Aug. 5, 1947 |
| 2,692,424 | Habel | Oct. 26, 1954 |